350-96.24

XR 4,043,675

United States

Guennel et al.

4,043,675

Aug. 23, 1977

[54] METHOD AND APPARATUS FOR COMPARING THE COLOR OF A STANDARD COLOR WITH THE COLOR OF A SAMPLE

[75] Inventors: Gottfried Kurt Guennel; Fred Charles Trusell, both of Littleton, Colo.

[73] Assignee: Marathon Oil Company, Findlay, Ohio

[21] Appl. No.: 680,258

[22] Filed: Apr. 26, 1976

[51] Int. Cl.$^2$ ............................................. G01J 3/52
[52] U.S. Cl. ..................................... 356/191; 350/30; 350/96 B
[58] Field of Search ............... 350/30, 96 B, 96 BC; 250/227; 356/41, 173, 174, 191–195, 209–212

[56] References Cited

U.S. PATENT DOCUMENTS

| | | | |
|---|---|---|---|
| 2,184,750 | 12/1939 | Meinhardt et al. | 350/30 |
| 2,510,145 | 6/1950 | Short | 350/30 X |
| 2,953,963 | 9/1960 | Bulkley et al. | 356/174 |
| 3,068,742 | 12/1962 | Hicks, Jr. et al. | 356/41 |
| 3,436,157 | 4/1969 | Adler et al. | 356/192 |
| 3,463,595 | 8/1969 | Blanc et al. | 250/227 X |
| 3,609,045 | 9/1971 | Stein | 350/30 UX |

*Primary Examiner*—F. L. Evans
*Attorney, Agent, or Firm*—Joseph C. Herring; Jack L. Hummel

[57] ABSTRACT

The color of a standard color is displayed adjacent a sample for direct comparison of the color of the sample with the color of the standard color by a method and apparatus comprising a color standard, a light source for supplying a uniform beam of light of a desired composition and intensity, means for receiving light from the light source and projecting the light onto the color standard, means for receiving light reflected from the color standard and transmitting the reflected light to a display means, and a display means for displaying the reflected light adjacent the sample to permit direct comparison of the color of the light reflected from the color standard with the color of the sample.

8 Claims, 4 Drawing Figures

METHOD AND APPARATUS FOR COMPARING THE COLOR OF A STANDARD COLOR WITH THE COLOR OF A SAMPLE

BACKGROUND OF THE INVENTION

1. Field of the Invention

The invention pertains to a method and apparatus for displaying light representative of a standard color adjacent a sample, and more particularly to a method and apparatus for displaying light reflected from a standard color adjacent a microscopic sample whereby the color of the sample may be directly compared with the color of the standard color in the field of view of a microscope.

2. Description of the Prior Art

For various reasons, it is often necessary to determine the precise color of a particular sample. This is particularly true of samples being subjected to microscopic examination to classify the sample's origin, composition or background. For example, in the field of palynology, the thermal maturation of spores and pollen that have been preserved in rock formations can be determined by classifying their color. Spores and pollen from relatively young formations are immature and appear to be a light greenish yellow. Spores and pollen from relatively old formations are mature and appear black. Spores and pollen from formations of intermediate age and maturities range in color from yellow through orange to brown. The color of the spores and pollen can be correlated with the thermal history of the formation to give valuable information relating to the potential for producing hydrocarbons from the formation. In analyzing such samples it is critical to distinguish between close shades of colors in order to properly classify the spore or pollen samples as to the degree of thermal maturation.

Color determination of microscopic samples has commonly been accomplished by microscopic examination of the samples and then subjectively comparing the samples with standard colors on a color chart. Since this process has commonly required the operator to examine the sample in the microscope and then take his eyes away to match the color of the sample with a color on a color chart, a high degree of subjectivity in color determination can result and lead to varying classification, even when the classification is done by the same operator under substantially uniform viewing conditions. The same problem is also present, although somewhat less acute, when non-microscopic samples are visually compared with a color standard to determine the standard color of the sample. Color determination can also be made by spectral examination of light reflected from a sample. Such processes, however, commonly require a relatively large investment in equipment and may be cumbersome in operation.

SUMMARY

General Statement of the Invention

It has been discovered that the foregoing deficiencies in determining the color of a sample can be overcome by displaying light characteristic of a standard color adjacent the sample so that the color of the sample and the color of the standard color can be directly compared.

BRIEF DESCRIPTION OF THE DRAWING

The inventive concepts are illustrated in the accompanying drawing in which.

DESCRIPTION OF THE PREFERRED EMBODIMENTS

The inventive concepts will be hereinafter discussed in a particularly preferred association with apparatus for determining the standard color of a microscopic sample.

Figure 1:
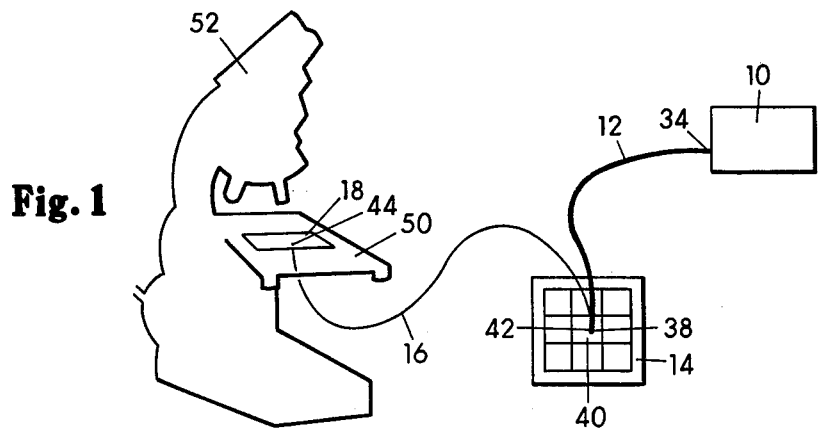
FIG. 1 is a schematic drawing of apparatus for displaying light representative of a standard color adjacent a microscopic sample.

Referring now to FIG. 1, a light source 10 supplies light having a uniform composition and intensity. A light source light transmission means for receiving light from the light source and projecting the light onto an individual standard color of a color standard 14, such as optic fiber bundle 12, provides light communication between the light source 10 and the standard color. A portion of the light projected onto the standard color by the optic fiber bundle, characteristic of the color of the standard color, is reflected by the standard color. A reflected light transmission means for receiving a portion of the light reflected from the standard color and transmitting the reflected light to a display means 18, such as single optic fiber 16, provides light communication between the standard color 14 and the display means 18. Display means for displaying the reflected light from the single optic fiber in the field of view of a microscope, generally shown at 18, displays the reflected light characteristic of the color of the standard color adjacent a microscopic sample for simultaneous viewing of the reflected light and the microscopic sample. The color of the reflected light may then be directly compared with the color of the microscopic sample to determine the standard color of the sample.

Figure 2:
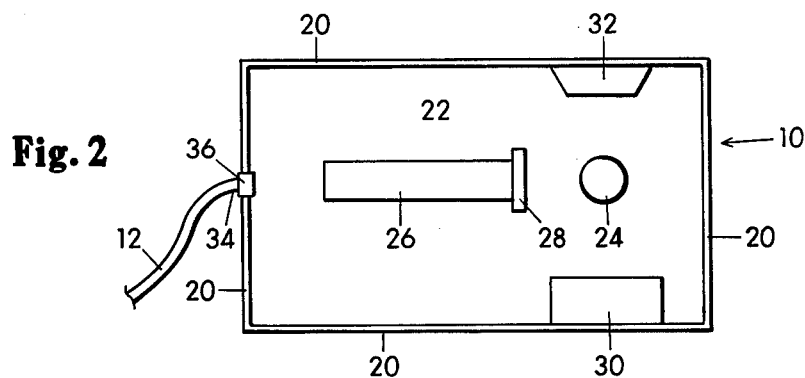
FIG. 2 is a top view of an illustrative light source of the apparatus of FIG. 1, showing the light source with its top removed.

The light source 10 can be any light source capable of supplying a relatively uniform, high intensity beam of light of known intensity and composition. Light from the light source 10 preferably has a color temperature approximately equal to that of sunlight, i.e., about 6200° K, and an intensity sufficient to provide an adequate amount of reflected light at the display means 18 for comparison of the reflected light with the sample. Referring now to FIG. 2, an illustrative light source 10 comprises a light-tight enclosure having sidewalls 20, bottom wall 22 and a top wall (not shown). The top wall or one of the sidewalls of the enclosure is preferably hingedly connected to the enclosure to provide access to the inside of the light source. The light source further comprises lamp 24, condenser tube 26 containing conventional lens condensers (not shown), light filter 28, enclosure fan 30 and light-tight enclosure vent 32. The lamp 24 may be, for example, a Sylvania 500Q/CL tungsten-iodide quartz lamp manufactured by Sylvania, Inc., Danvers, Massachusetts, having a 500W and 10,000 lumen rating and emitting light having a color temperature of about 3000° K. The light filter 28 functions to alter the character of the light entering condenser tube 26 from lamp 24 so that light passing through the tube has a color temperature approximately equal to that of sunlight. The condensers in condenser tube 26 concentrate light passing through condenser tube 26 for receipt by the optic fiber bundle. Enclosure fan 30 and enclosure vent 32 are provided to maintain the temperature within the enclosure at a relatively low level when the apparatus is in operation.

Referring now to FIGS. 1 and 2, the light source light transmission means for receiving light from the light source 10 and projecting the light onto a standard color of color standard 14, such as optic fiber bundle 12, provides light communication between the light source and the standard color. The optic fiber bundle has a light receiving end 34 maintained in optical alignment with the condenser tube 26 to provide light communication between the condenser tube and the light receiving end of the optic fiber bundle as, for example, by retaining the light receiving end 34 of the optic fiber bundle in a hole through the sidewall 20 by means of grommet 36. The optic fiber bundle further comprises a light projecting end 38 adapted to be manually moved to a position in close proximity with various individual standard colors of the color standard. Thus, light from the light source passes through the light filter 28 and condenser tube 26, is received by the light receiving end of the optic fiber bundle 34, transmitted through the optic fiber bundle and projected onto an individual standard color of the color standard 14. The means for receiving light from the light source and projecting the light onto a standard color may be, for example, an optic fiber bundle containing 64 Crofon optic fibers, each having a diameter of 10 mils, manufactured by E. I. DuPont de Nemours & Co., Wilmington, Delaware.

The color standard 14 can be any color standard capable of reflecting a portion of the light from the optic fiber bundle 12 so as to be representative of at least one individual standard color 40. Exemplary of such a color standard is the *Munsell Book of Color, Glossy Finish Collection,* published by the Munsell Color Division, Kollmorgen Corporation, 2441 North Calvert St., Baltimore, Md. 21218, which contains a variety of standard colors classified by hue, value and chroma. Other color standards may be equally useful with the present invention.

Figure 3:
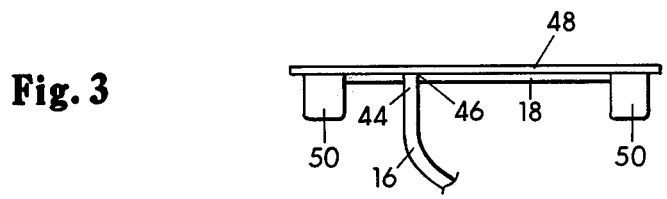
FIG. 3 is a front view of a portion of the apparatus of FIG. 1 showing an illustrative means for displaying light reflected from the standard color for direct comparison of the color of the standard color with the color of the microscopic sample.

Referring now to FIGS. 1 and 3, the reflected light transmission means for receiving light reflected from the standard color and transmitting the light to display means 18, such as single optic fiber 16, provides light communication between the color standard and the display means. The single optic fiber 16 has a light receiving end 42 for receiving light reflected from the color standard, and a light projecting end 44 for projecting the reflected light at the display means 18. A portion of the light from the light projecting end 38 of the optic fiber bundle 12 is reflected by the standad color 40, received by the receiving end 42 of the single optic fiber 16 and transmitted through the single optic fiber to the display means. The reflected light transmission means for receiving light reflected from the standard color and transmitting the light to the display means may be, for example, a single 10 mils diameter Crofon optic fiber manufactured by E. I. DuPont de Nemours & Co., Wilmington, Del.

The display means for displaying the reflected light from the single optic fiber 16 in the field of view of a microscope, such as a thin piece of colorless sheet material 18, is rigidly mounted on microscope stage 50. The piece of colorless sheet material 18, made, for example, of glass or plastic, has a hole 46 therein for receiving the light projecting end 44 of the single optic fiber and maintaining the light projecting end of the optic fiber in optical communication with the viewing portion of the microscope, preferably in abutting relationship with a sample slide 48.

In using the apparatus, a microscopic sample is conventionally prepared on a microscope slide 48 and is placed on the stage 50 of the microscope. The sample may then be conventionally viewed through the microscope. The color of the microscope sample is determined by the steps of supplying light of a predetermined composition and intensity and preferably having a color temperature approximately equal to that of sunshine, projecting the light onto an individual standard color of a color standard, and displaying at least a portion of the light reflected from the color standard in the field of view of the microscope for direct comparison of the color of the reflected light with the color of the microscopic sample. If the color of the reflected light does not appear to be equivalent to the color of the microscopic sample, then the light from the light source is projected onto a different individual standard color and the color of the reflected light is again compared with the color of the sample. This process is continued until the color of the sample is matched with the color of the light reflected from an individual standard color of the color standard. In this manner, the color of the sample is determined to be the color of the color standard with which it is matched.

Figure 4:
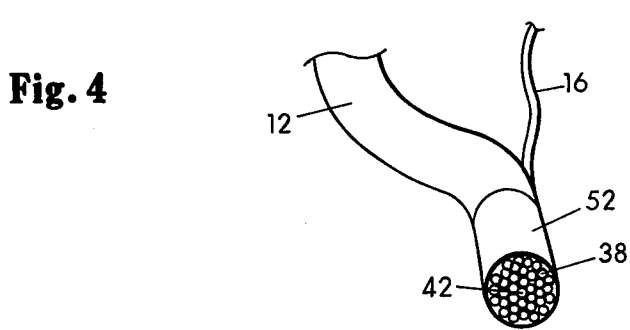
FIG. 4 is a perspective view of a portion of the apparatus of FIG. 1 showing the light receiving end of the single optic fiber embedded in about the middle of the light projecting end of the optic fiber bundle.

In practice, the light projecting end of the optic fiber bundle and the light receiving end of the single optic fiber are manually moved to a position directly above, and preferably in abutting engagement with, the various individual standard colors of the color standard, as the color of each standard is directly compared with the color of the sample. Referring to FIG. 4, it has been determined that particularly good results may be obtained by embedding the light receiving end 42 of the single optic fiber 16 in the light projecting end 38 of the optic fiber bundle 12 with the ends of the single optic fiber and fiber bundle being flush and the single optic fiber being in approximately the middle of the bundle. This may be accomplished by slitting the covering of the light projecting end of the optic fiber bundle, separating the ends of the fibers of the bundle, inserting the light receiving end of the single optic fiber in about the middle of the fibers of the bundle, and then reforming the light projecting end of the optic fiber bundle by a suitable fastener, such as a piece of tape 52.

The use of a single optic fiber having a diameter of approximately 10 mils as the reflected light transmission means is particularly preferred since the single optic fiber projects a "point" source of reflected light of sufficient size for viewing in the field of view of the microscope to enable a satisfactory color determination, but does not provide so large a projection of the reflected light as to prevent satisfactory viewing of the microscope sample.

While the present invention has been described in terms of a presently preferred method and apparatus for determining the color of a sample, various modifications will be apparent to a person skilled in the art. For example, it is contemplated that the light source may be variously altered to supply light of any composition and intensity as required by a particular application, the light projecting means and the reflected light transmission means may be embodied in other light transmission forms, and the display means may be variously altered to suit the particular sample size and method of viewing. It is intended that such modifications be included within the scope of the appended claims.

What is claimed is:

1. Apparatus for displaying the color of an individual standard color of a color standard adjacent a sample, for direct comparison of the color of the standard color with the color of a sample comprising:
   a. a light source;
   b. an optic fiber bundle for receiving light from the light source and projecting the light on an individual standard color of a color standard, the optic fiber bundle having a light receiving end positioned to receive light from the light source and a light projecting end positioned in close proximity with the individual standard color to project light from the light source thereon; and
   c. an optic fiber for receiving light reflected from the standard color and transmitting the reflected light, the optic fiber having a light receiving end positioned in close proximity with the standard color of the color standard to receive light reflected therefrom and a light projecting end positioned adjacent the sample for direct comparison of the color of the light transmitted by the optic fiber with the color of the sample.

2. The apparatus of claim 1 wherein the light receiving end of the optic fiber is embedded in about the middle of the light projecting end of the optic fiber bundle.

3. The aparatus of claim 1 wherein a condenser lens is located between the light source and the light receiving end of the optic fiber bundle to focus the light from the light source on the light receiving end of the optic fiber bundle.

4. Apparatus for displaying the color of an individual standard color of a color standard for direct comparison of the color of the standard color with the color of a microscopic sample in the field of view of a microscope comprising:
   a. a light source;
   b. an optic fiber bundle for receiving light from the light source and projecting the light onto an individual standard color of a color standard, the optic fiber bundle having a light receiving end positioned to receive light from the light source and a light projecting end positioned in close proximity with the individual standard color to project light from the light source thereon; and
   c. an optic fiber for receiving light reflected from the standard color and transmitting the reflected light, the optic fiber having a light receiving end positioned in close proximity with the standard color of the color standard to receive light reflected therefrom and a light projecting end positioned adjacent the sample in the field of view of the microscope for direct comparison of the color of the light transmitted by the optic fiber with the color of the microscopic sample.

5. The apparatus of claim 4 wherein the light receiving end of the single optic fiber is embedded in about the middle of the light projecting end of the optic fiber bundle.

6. Apparatus for displaying the color of an individual standard color of a color standard in the field of view of a microscope for direct comparison with the color of a microscopic sample, comprising:
   a. a light source;
   b. an optic fiber bundle having a light receiving end positioned to receive light from the light source and a light projecting end positioned in close proximity with an individual standard of a color standard to project light from the light source thereon;
   c. a single optic fiber having a light receiving end positioned in close proximity with the standard color to receive light reflected therefrom a light projecting end positioned adjacent the microscopic sample in the field of view of a microscope; and
   d. a microscope adapted for simultaneous viewing of the light transmitted by the single optic fiber and the microscopic sample for direct comparison of the color of the standard color with the color of the sample.

7. A method of displaying the color of an individual standard color of a color standard adjacent a sample for direct comparison of the color of the standard color with the color of the sample, comprising:
   a. supplying light from a light source;
   b. positioning a light receiving end of an optic fiber bundle to receive light from the light source;
   c. positioning a light projecting end of the optic fiber bundle in close proximity with the standard color to project light from the light source thereon;
   d. positioning a light receiving end of a single optic fiber in close proximity with the standard color to receive light reflected therefrom; and
   e. postiioning a light projecting end of the single optic fiber adjacent the sample for direct comparison of the color of the light transmitted by the optic fiber with the color of the sample.

8. A method of displaying the color of an individual standard color of a color standard adjacent a microscopic sample for direct comparison of the color of the standard color with the color of the sample, comprising:
   a. supplying light from a light source;
   b. positioning a light receiving end of an optic fiber bundle to receive light from the light source;
   c. positioning a light projecting end of the optic fiber bundle in close proximity with the standard color to project light from the light source thereon;
   d. positioning a light receiving end of a single optic fiber in close proximity with the standard color to receive light reflected therefrom; and
   e. positioning a light projecting end of the single optic fiber adjacent the sample in the field of view of the microscope for direct comparison of the color of the light transmitted by the optic fiber with the color of the microscopic sample.

* * * * *